Jan. 31, 1956   D. B. VAN DOLAH   2,732,583
POULTRY PROCESSING APPARATUS
Original Filed April 22, 1950   2 Sheets-Sheet 1

INVENTOR.
Delos B. Van Dolah
BY
R G Story
ATTORNEY

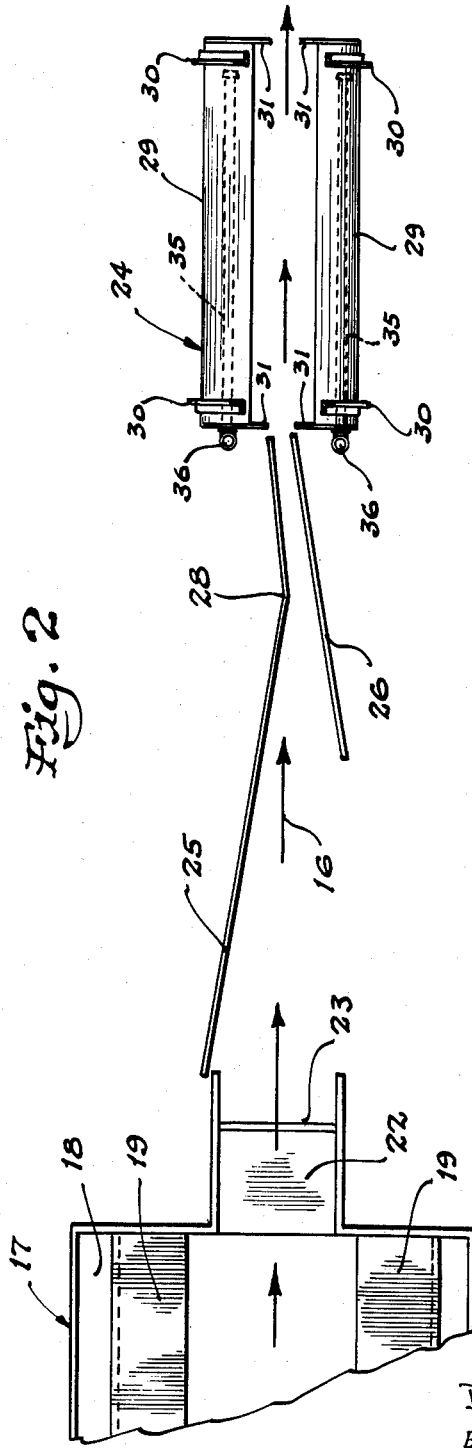

United States Patent Office 2,732,583
Patented Jan. 31, 1956

2,732,583

POULTRY PROCESSING APPARATUS

Delos B. Van Dolah, Chicago, Ill., assignor to Swift & Company, Chicago, Ill., a corporation of Illinois Original application April 22, 1950, Serial No. 157,421, now Patent No. 2,663,049, dated December 22, 1953. Divided and this application August 21, 1952, Serial No. 305,599

12 Claims. (Cl. 17—11.2)

The present invention relates to an apparatus for facilitating the defeathering of fowls.

In the picking of poultry the common practice is to loosen the feathers before picking by immersing the fowl in hot water in a scalding tank. It has proved to be a difficult problem to determine the correct scalding conditions. A lengthy scald at relatively high temperature is the most desirable from the standpoint of the easy removal of the feathers, but this produces complications in that the mechanical pickers commonly used will then "bark" or remove outer layers of skin of the bird, spoiling the appearance and value of the product. As a result the present practices are a compromise and certain of the feathers may prove to be particularly difficult to remove because they do not loosen as readily as the remainder. This is the case with the lower feathers on the legs of the fowls, those in what is commonly known as the garter area.

The principal object of the present invention is to provide a method and an apparatus for the selective scalding of various portions of the fowl so as to loosen all of the feathers sufficiently for them to be easily removed by mechanical pickers, while at the same time not scalding any portion of the bird to an extent that there will be barking of the bird by the mechanical picking. To achieve this end I have devised an apparatus whereby the various portions of the birds are subjected to heated fluids with different portions being subjected to fluids of different temperatures and/or for different lengths of time whereby the amount of scalding of each portion is more nearly an optimum and is not merely a compromise of the various limitations applicable to the bird as a whole. This is performed in a continuous process whereby a production line operation may be maintained.

Additional objects and advantages will become apparent from the following description taken in conjunction with the drawings in which:

Fig. 2 is a plan view of the apparatus of Fig. 1 in the absence of the poultry conveyor.

Figure 1:
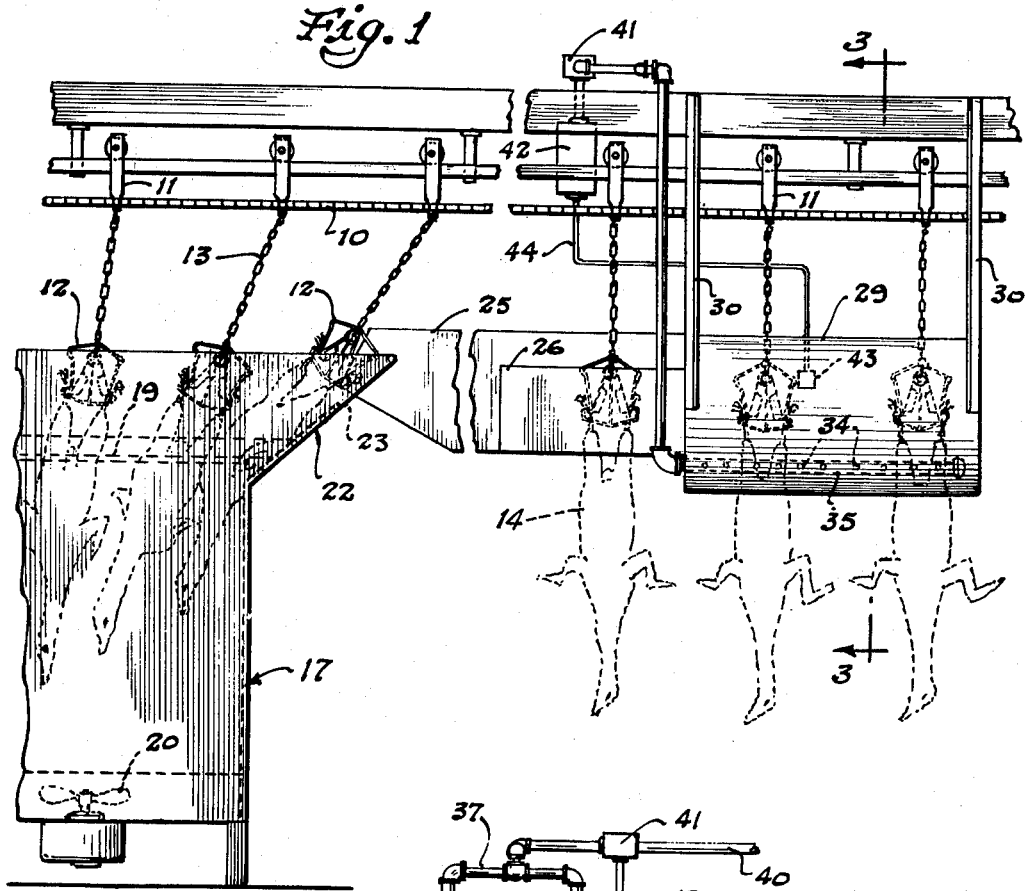
Fig. 1 is an elevational view of an embodiment of the present invention.
Figure 3:
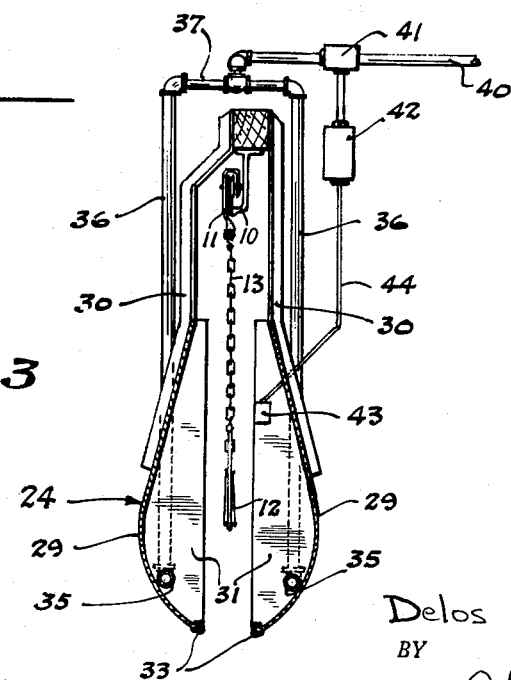
Fig. 3 is an end elevation of the garter steamer of Fig. 1.

In the embodiment illustrated herein a conveyor, generally 10, is utilized to carry the poultry through the steaming process. A plurality of hangers 11 are moved along the conveyor 10 by means of a suitable power source in a manner well known in the art. A plurality of holders 12 adapted to be clamped about the legs of the birds are supported from the individual hangers 11 by means of a chain 15. The conveyor moves the individual birds 14 along a predetermined path as generally indicated by line 16 in Fig. 2.

The path of movement of the birds first intersects a scalding tank, generally 17. The exact details of the structure of tank may be varied to suit the individual operator and may be generally that disclosed in Patent No. 2,389,404, the disclosure of which is incorporated herein by reference. In such a tank a flow is maintained upwardly in the spaces 18 adjacent the sides of the tank, inwardly over a pair of shelves 19, and returning to the bottom of the tank through the central portion thereof. The flow is maintained by means of a power driven propeller 20.

The exit end of the tank 17 may be sloped outwardly in the direction of the line of movement of the birds, as indicated at 22, and be cut off shortly above the water level, as indicated at 23. Such structure tends to reduce the swing of the bird as it falls free of the tank while, at the same time, holding the slop out of the end of the tank to a minimum. In addition one or more stops, or the like, may be used beyond the end of the tank to further reduce the swing of the bird.

Between scalding tank 17 and the garter steamer, generally 24, are a pair of guides 25 and 26 to either side of the path of movement 16 of the bird 14. The bottom of each of these guides is well above the area through which the bodies of the birds 14 move.

At least one of the guides begins at a point along the path of movement well back of the garter steamer 24, as illustrated in Fig. 2 by guide 25. This guide serves to begin to align the legs of the birds to a given orientation as they pass through the garter steamer 24. To insure that such an alignment is obtained, guide 25 is positioned to encroach slightly upon the path of movement 16, as indicated at 28. At the same time guide 26 has approached from the other side so that as the birds 14 enter the garter steamer 24 the holders 12, and an imaginary plane between the legs of the birds, have assumed a position substantially parallel to the path of movement 16. This alignment insures a uniform positioning of the legs with respect to the steaming jets.

Garter steamer 24 includes an enclosure about the portion of the path of movement 16 traversed by the legs of the birds, which enclosure is formed by a pair of sheet metal sides 29 suitably supported as by means of hangers 30. Across the end of each of sides 29 is a rubber flap 31. A rubber bumper 33 along the bottom edge of the sides 29 prevents the edges of the sides from damaging the legs of the birds.

The rubber parts are preferably made of a steam rubber gasket material to satisfactorily resist the temperatures involved. Along either side of the enclosure are a plurality of steam nozzles or jets 34, which jets may be small holes drilled in a steam line 35 supplied from a suitable steam header 36 through a connecting pipe 37.

In steam line 40 between header 36 and a suitable source of steam supply is a valve 41. An electrical or pneumatic valve operator 42 automatically adjusts the setting of valve 41 in response to the temperature within the garter steamer 24 as indicated by a temperature responsive device 43 connected to operator 42 as indicated at 44. In other embodiments an automatic controller may be dispensed with and the valve operated manually.

After leaving the garter steamer 24 the conveyor may move the birds to a picking station at which point the feathers are removed from the bird by the rotary fingers of a mechanical picker.

It is believed that the operation of the embodiment of the present invention is clear from the preceding description of its structure. The individual birds suspended from conveyor 10 are first moved through the liquid scald in tank 17. While the particular local conditions will vary the exact details of operation to a certain extent, the birds are generally left in the tanks from about fifty to ninety seconds with a water temperature of approximately 120° to 130° F. The exact amount of that scalding should be sufficient to loosen the body feathers but not so long as to tend to cause any barking of the skin of the body upon picking.

After leaving the liquid scald the birds proceed through the garter steamer where the legs are subjected to additional scalding of from five to ten seconds. The temperature within the garter steamer 24 may be maintained at about 170° F. This loosens the garter feathers to an extent to make them much easier to pick than they have been previously under the practice of scalding the bird as a whole.

The foregoing description is for the purpose of compliance with 35 U. S. C. 112 and should not be construed as imposing any unnecessary limitations upon the appended claims.

The present application is a division of my prior application, Serial No. 157,421, now Patent No. 2,663,049, issued December 22, 1953.

I claim:

1. A device for scalding birds preparatory to picking the feathers therefrom, including a fluid container adapted to hold a heavier than air heated fluid in which the bodies of the said birds may be immersed, leg scalding means adjacent said container constructed and arranged to apply heated fluid to the legs only of the birds to additionally scald only the legs of the birds, and conveying and supporting means extending over said container and said scalding means and supporting the birds by the legs with the bodies of the birds in said container and said legs sequentially in said scalding means.

2. A device for scalding birds preparatory to picking the feathers therefrom, including a fluid container adapted to hold a heavier than air heated fluid in which the bodies of the said birds may be immersed, an enclosure having openings at each end thereof and an opening across the bottom connecting the two end openings, means within said enclosure to produce a relatively high temperature within said enclosure, one of said ends being adjacent said container, and conveying and supporting means extending over said container and said enclosure and supporting the birds by the legs with the bodies of the birds in said container and sequentially through said enclosure through the opening in said one end of the enclosure with the legs of the birds within the enclosure and the bodies extending through the bottom opening of the enclosure whereby the legs only of the birds are subjected to an additional heating.

3. A device for scalding birds preparatory to picking the feathers therefrom, including a fluid container adapted to hold a heavier than air heated fluid in which the bodies of the said birds may be immersed, an enclosure having openings at each end thereof and an opening across the bottom connecting the two end openings, a plurality of steam nozzles positioned adjacent a side of the enclosure and directed generally towards the opposite side of the enclosure, one of said ends being adjacent said container, and conveying and supporting means extending over said container and said enclosure and supporting the birds by the legs with the bodies of the birds in said container and sequentially through said enclosure through the opening in said one end of the enclosure with the legs of the birds within the enclosure and the bodies extending through the bottom opening of the enclosure whereby the legs only of the birds are subjected to an additional scald.

4. A device for scalding birds preparatory to picking the feathers therefrom, including a fluid container adapted to hold a heavier than air heated fluid in which the bodies of the said birds may be immersed, an enclosure having openings at each end thereof and an opening across the bottom connecting the two end openings, a plurality of steam nozzles positioned within the enclosure adjacent each side of the bottom of the closure and directed generally towards the opposite sides of the enclosure, means connected to said steam nozzles and to a source of steam to control the amount of steam supplied to said steam nozzles, one of said ends being adjacent said container, and conveying and supporting means extending over said container and said enclosure and supporting the birds by the legs with the bodies of the birds in said container and sequentially through said enclosure through the opening in said one end of the enclosure with the legs of the birds within the enclosure and the bodies extending through the bottom opening of the enclosure whereby the legs only of the birds are subjected to an additional scald.

5. A garter scalder for use in scalding birds supported by the legs by a shackle having leg gripping portions from an overhead conveyor, said scalder including an enclosure having openings at each end thereof and an opening across the bottom connecting the two end openings, and means within said enclosure to produce a relatively high temperature within said enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the relatively high temperature within said enclosure.

6. A garter scalder for use in scalding birds supported by the legs by a shackle having leg gripping portions from an overhead conveyor, said scalder including an enclosure having openings at each end thereof and an opening across the bottom connecting the two end openings, and means within said enclosure to produce a relatively high temperature within said enclosure, said means being positioned adjacent the bottom of the enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the relatively high temperature within said enclosure.

7. A garter scalder for use in scalding birds supported by the legs by a shackle having leg gripping portions from an overhead conveyor, said scalder including an enclosure having openings at each end thereof and an opening across the bottom connecting the two end openings, heating means within said enclosure to produce a relatively high temperature within said enclosure, and control means operatively associated with said heating means to regulate the temperature within said enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the relatively high temperature within said enclosure.

8. A garter scalder for use in scalding birds supported by the legs by a shackle having leg gripping portions from an overhead conveyor, said scalder including an enclosure having openings at each end thereof and an opening across the bottom connecting the two end openings, guide means extending outwardly from said enclosure at each side of the opening in one end thereof to align the shackles and the legs of the birds generally parallel to the sides of the enclosure, and means within said enclosure to produce a relatively high temperature within said enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the relatively high temperature within said enclosure.

9. A garter scalder for use in scalding birds supported by the legs by a shackle having leg gripping portions from an overhead conveyor, said scalder including an enclosure having openings at each end thereof and an opening across the bottom connecting the two end openings, a pair of guides extending outwardly from said enclosure at each side of the opening in one end thereof to align the shackles and the legs of the birds generally parallel to the sides of the enclosure, the portions of said guides at said end being spaced from each other substantially the same width as the width of the opening in said end with the remainder of the guides being flared away from each other, and means within said enclosure to produce a relatively high temperature within said enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the relatively high temperature within said enclosure.

10. A garter scalder for use in scalding birds supported by the legs by a shackle having leg gripping portions from an overhead conveyor, said scalder including an enclosure having openings at each end thereof and an opening across the bottom connecting the two end openings, and a plurality of steam nozzles positioned adjacent a side of the enclosure and directed generally towards the opposite side of the enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the steam within said enclosure.

11. A garter scalder for use in scalding birds supported by the legs by a shackle having leg gripping portions from an overhead conveyor, said scalder including an enclosure having openings at each end thereof and an opening across the bottom connecting the two end openings, and a plurality of steam nozzles positioned adjacent each side of the enclosure and directed generally towards the opposite sides of the enclosure, said steam nozzles being adjacent the bottom of the enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the steam within said enclosure.

12. A garter scalder for use in scalding birds supported by the legs by a shackle having leg gripping portions from an overhead conveyor, said scalder including an enclosure having openings at each end thereof and an opening across the bottom connecting the two end openings, a plurality of steam nozzles positioned adjacent a side of the enclosure and directed generally towards the opposite side of the enclosure, and control means connected to said steam nozzles to regulate the flow of steam from said nozzles in response to the ambient temperature within said enclosure, said enclosure being positioned with said two end openings aligned with said conveyor and at a height at which the bottom of the enclosure is spaced below said leg gripping portions of the shackle a distance substantially equal to the lengths of the legs of the birds whereby the legs only of the birds are exposed to the steam within said enclosure.

References Cited in the file of this patent

UNITED STATES PATENTS

| | | |
|---|---|---|
| 1,146,589 | Morrison | July 13, 1915 |
| 2,152,082 | Onorato et al. | Mar. 28, 1939 |
| 2,202,022 | Ozouf | May 28, 1940 |
| 2,607,073 | Johnson | Aug. 19, 1952 |